US009607526B1

(12) United States Patent
Hsu-Hoffman et al.

(10) Patent No.: US 9,607,526 B1
(45) Date of Patent: Mar. 28, 2017

(54) PRE-LICENSE DEVELOPMENT TOOL

(71) Applicant: Allstate Insurance Company, Northbrook, IL (US)

(72) Inventors: Chienlan Hsu-Hoffman, Palo Alto, CA (US); Gibbs Evan, Daly City, CA (US); Alicia Dornadic, Belmont, CA (US); Regina Madigan, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 54 days.

(21) Appl. No.: 13/826,890

(22) Filed: Mar. 14, 2013

(51) Int. Cl.
*G09B 9/04* (2006.01)
*G09B 19/16* (2006.01)

(52) U.S. Cl.
CPC ................. *G09B 19/167* (2013.01)

(58) Field of Classification Search
CPC ......... G09B 19/167; G09B 19/16; G09B 9/04
USPC ................................. 434/62–66, 69
See application file for complete search history.

(56) References Cited

U.S. PATENT DOCUMENTS

| | | | |
|---|---|---|---|
| 7,269,539 B2 | 9/2007 | Wang | |
| 7,349,830 B2 | 3/2008 | Gilbert et al. | |
| 8,425,289 B2 | 4/2013 | Beggs | |
| 2002/0090985 A1 | 7/2002 | Tochner et al. | |
| 2008/0022211 A1* | 1/2008 | Jones | G09B 7/00 715/739 |
| 2008/0081694 A1 | 4/2008 | Hong et al. | |
| 2008/0280684 A1 | 11/2008 | McBride et al. | |
| 2010/0160013 A1 | 6/2010 | Sanders | |
| 2011/0258044 A1 | 10/2011 | Kargupta | |
| 2012/0053805 A1 | 3/2012 | Dantu | |
| 2012/0100509 A1* | 4/2012 | Gunderson et al. | 434/62 |
| 2012/0135382 A1* | 5/2012 | Winston et al. | 434/65 |
| 2012/0215375 A1 | 8/2012 | Chang | |
| 2012/0221216 A1* | 8/2012 | Chauncey et al. | 701/51 |
| 2013/0017891 A1 | 1/2013 | Romero et al. | |
| 2013/0141249 A1 | 6/2013 | Pearlman et al. | |
| 2013/0316311 A1* | 11/2013 | England | 434/65 |
| 2014/0125678 A1 | 5/2014 | Wang et al. | |

FOREIGN PATENT DOCUMENTS

WO 0158548 A1 8/2001

OTHER PUBLICATIONS

"Apps for Vehicles Challenge: Final Round (/)," http://vehicles.challenge.gov/submissions/13988-green-button-gamer-driver-challenge?sso=3f2c998e9f665c6c7266ec2622537b2e5c5c934fbd965ede16c8b6710a93932b8f662e0f82f67b24e7e9f07d13f6699 8376c. (last retrieved Jul. 25, 2013).

(Continued)

*Primary Examiner* — Andrew Iwamaye
*Assistant Examiner* — Jerry-Daryl Fletcher
(74) *Attorney, Agent, or Firm* — Banner & Witcoff, Ltd.

(57) ABSTRACT

Methods, computer-readable media, software, and apparatuses provide a tool for use by drivers and/or coaches throughout the pre-license stage of obtaining a driver's license. A pre-license program may control a computing device to collect drive data while a driver is driving a vehicle. This drive data may be used to detect a drive event. Then, the computing device may present coaching information associated with the detected drive event. The coaching information may provide a passenger, such as a coach or parent, with real-time advice for instructing the driver how to improve his/her driving skills. Moreover, the drive data collected may be used to prepare reports providing feedback to the drivers and coaches.

19 Claims, 6 Drawing Sheets

(56) References Cited

OTHER PUBLICATIONS

US Non Final Office Action for U.S. Appl. No. 13/826,429 issued Oct. 1, 2014.
Rick Broida, "Road Wars app turns safe driving into a game," CNET Reviews, Nov. 15, 2013, http://reviews.cnet.com/8301-19512_7-57612558-233/road-wars-app-turns-safe-driving-into-a-game/ (last visited Nov. 25, 2013).
Non Final Office Action issued on Jul. 1, 2015 U.S. Appl. No. 14/038,982.
Final Office Action issued Jul. 28, 2015 in U.S. Appl. No. 13/826,429.
Feb. 2, 2016—Final Office Action—U.S. Appl. No. 14/038,982.
May 5, 2016—(US) Office Action—U.S. Appl. No. 13/826,429.
Aug. 26, 2016—(US) Non-Final Office Action—U.S. Appl. No. 14/038,982.
Nov. 8, 2016—(US) Office Action—U.S. Appl. No. 13/826,429.

\* cited by examiner

PRE-LICENSE DEVELOPMENT TOOL

FIELD OF ART

Aspects of the disclosure generally relate to computer systems and computer software. More particularly, aspects of this disclosure provide a tool for generating feedback for drivers seeking their driver's license and assisting others to instruct the drivers throughout the pre-license stage.

BACKGROUND

Car accidents are a common cause of injury and damage, and the costs resulting from car accidents can be significant. The frequency of car accidents is especially high for young and/or novice drivers. There is a demand to reduce the number of accidents among this group of drivers. In the United States, many states require mandatory training for new drivers. This training may include attending classes and/or taking a driving course with a certified instructor. Further, in many states, prior to obtaining a driver's license, users may receive a driving permit that allows them to drive as long as another person with a valid driver's license is in the vehicle. Often this other person is asked or desires to teach the driver to drive. However, this other person might not know how to teach the driver or might want advice on how to teach the driver.

Accordingly, new systems, devices, methodologies, and software are desired to provide teaching assistance to passengers, such as parents, driving coaches, etc., to aid in teaching novice drivers, such as teenagers, how to drive.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a tool that tracks progression of driving skills and experience of a student as he/she learns to drive. The tool further presents coaching advice to coaches (e.g., parents, friends, etc.) in real-time while the student is driving and feedback to students for their review after driving.

Aspects of this disclosure provide computer readable media storing computer-executable instructions that, when executed, cause a computing device (e.g., a parent's smartphone) to collect drive data (e.g., acceleration, deceleration, g-force, time of day, etc.) while a driver is driving a vehicle, detect a drive event based on the drive data, and present coaching information associated with the drive event in response to detecting the drive event. A drive event may be, for example, a brake event or turn event. The computer-executable instructions may further cause the computing device to determine the coaching information based on driver information associated with the driver. In some cases, this driver information may be retrieved from another computing device associated with the driver (e.g., a smartphone of the driver). During the drive, the computer-executable instructions may further cause the computing device to receive a user request for coaching information and may present the requested coaching information. Also during the drive, the computer-executable instructions may further cause the computing device to predict a future drive event, such as an upcoming brake event and/or upcoming turn event. In response to predicting a future drive event, the computer-executable instructions may cause the computing device to present coaching information for the predicted future drive event. After the drive, the coach's (e.g., parent's) smartphone may transmit the coaching information to the driver's smartphone, so the driver may review the coaching information. Aspects of the disclosure also provide the computing device or apparatus including the computer readable media storing such computer-executable instructions. The computing device or apparatus may be a smartphone, tablet, laptop, vehicle's computing device (including a vehicle's in-dash display screen), etc.

Aspects of the disclosure further provide a method of collecting drive data while a driver is driving a vehicle, detecting a drive event (e.g., brake event, turn event, etc.) based on the drive data, and presenting coaching information associated with the drive event in response to detecting the drive event. This method may further include retrieving driver information from another computing device associated with the driver (e.g., a driver's smartphone), determining the coaching information based on the driver information associated with the driver, and transmitting the coaching information to the driver's smartphone. The method may also include receiving a user request for a second piece of coaching information, and presenting the second piece of coaching information. Further, the method may include providing a suggested route, predicting a future drive event using map information of the suggested route, and presenting additional coaching information associated with the future drive event in response to predicting the future drive event. Still, in some examples, the method may also include recording audio within the vehicle while the driver is driving, and transmitting the recording to another computing device after the drive.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which.

DETAILED DESCRIPTION

In accordance with various aspects of the disclosure, methods, computer-readable media, software, and apparatuses are disclosed that provide a suite of pre-license applications that drivers, coaches, and vehicles may execute to provide an enhanced driver education experience. A pre-license coach application may execute on a passenger's user device, e.g., a smartphone, to collect drive data as a driver is practicing driving, and to present coaching information that the passenger may use to coach the driver during the drive. The pre-license coach application may give specific coaching information based on events occurring during the drive. For example, the pre-license coach application may detect a brake event and/or turn event, and provide coaching information to the passenger so that the passenger may teach (or coach) the driver about braking and/or turning, respectively.

Meanwhile, a pre-license driver application may execute on a driver's user device, e.g., a smartphone, to collect drive data as the driver is driving. The pre-license driver application may then later present the drive data to the driver so that he/she can learn about their driving skills and improve their driving skills. The pre-license driver application may also present coaching information to educate the driver on how to improve. In some cases, the pre-license driver application may cause the driver's user device to output audible coaching information thereby performing similar coaching functions that the pre-license coach application causes the passenger's user device to perform.

Additionally, a pre-license vehicle application may execute on a vehicle's computing device to collect data about a drive as well. The pre-license vehicle application may allow the vehicle's computing device to communicate with the driver's user device and/or passenger's user device. In particular, the pre-license vehicle application may transmit data collected during a drive to the driver's user device and/or passenger's user device. In some cases, the pre-license vehicle application may cause the vehicle's computing device to perform the same coaching functions that the pre-license coach application causes the passenger's user device to perform. Thus, the vehicle's computing device may present coaching information to the passenger that the passenger may use to teach the driver. Still, in some cases, the pre-license vehicle application may cause the vehicle's computing device to present the coaching information directly to the driver.

Although a suite of pre-license applications (e.g., pre-license driver application, pre-license coach application, and pre-license vehicle application) are described above, these applications may be implemented as a single application. That is, a single application, herein referred to as the pre-license program, may be executed on various computing devices which may perform particular modules of the pre-license program. As such, aspects of the disclosure may be implemented by various computing devices (e.g., a driver's computing device, passenger's computing device, or vehicle's computing device) operating in tandem.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made. Furthermore, the disclosures of each of the following patent applications are incorporated by reference herein in their entirety: U.S. patent application Ser. No. 13/216,849, filed Aug. 24, 2011, entitled "In Vehicle Driver Feedback Device;" and the concurrently-filed U.S. Patent Application entitled "Interactive Driver Development" and identified as Ser. No. 13/826,429 in the law offices of Banner & Witcoff, Ltd.

Figure 1:
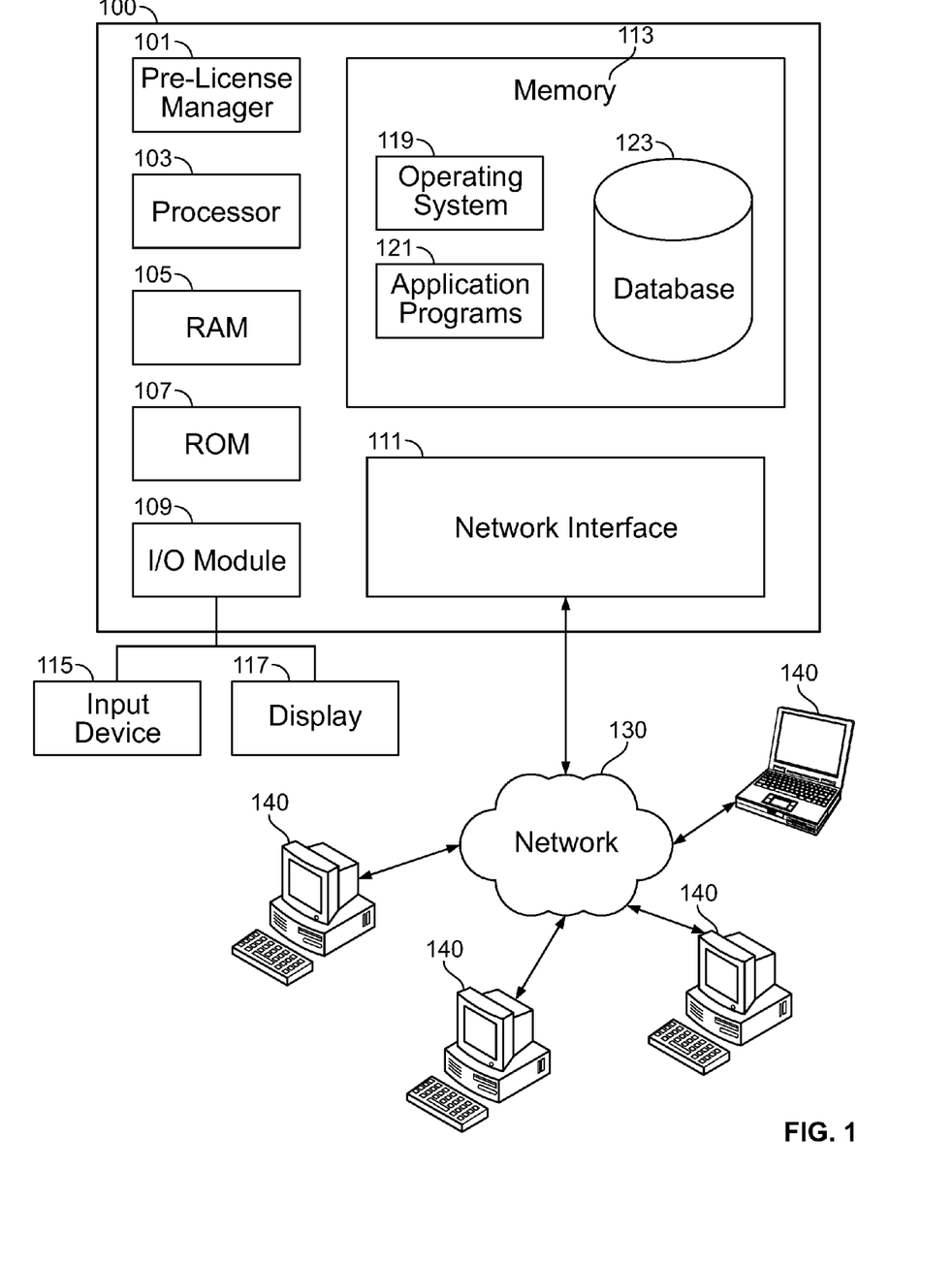
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a pre-license manager 101 for performing methods and executing instructions of the pre-license program described herein. The pre-license manager 101 may be implemented with a processor and memory and/or ASIC. Throughout this disclosure, the pre-license manager 101 may be used to reference a combination of the processor and memory storing instructions executed by that processor and/or the instructions themselves. The processor of the pre-license manager 101 may operate in addition to or in conjunction with another processor 103 of the computing device 100. Both the pre-license manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the pre-license program, such as rules for detecting drive events and what coaching information to provide in response to which drive events, described in further detail below. On some computing devices 100, the input device 115 may be operated by users to interact with the pre-license program, including providing user information, assessing a driver's performance, reviewing a driver's performance, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2:
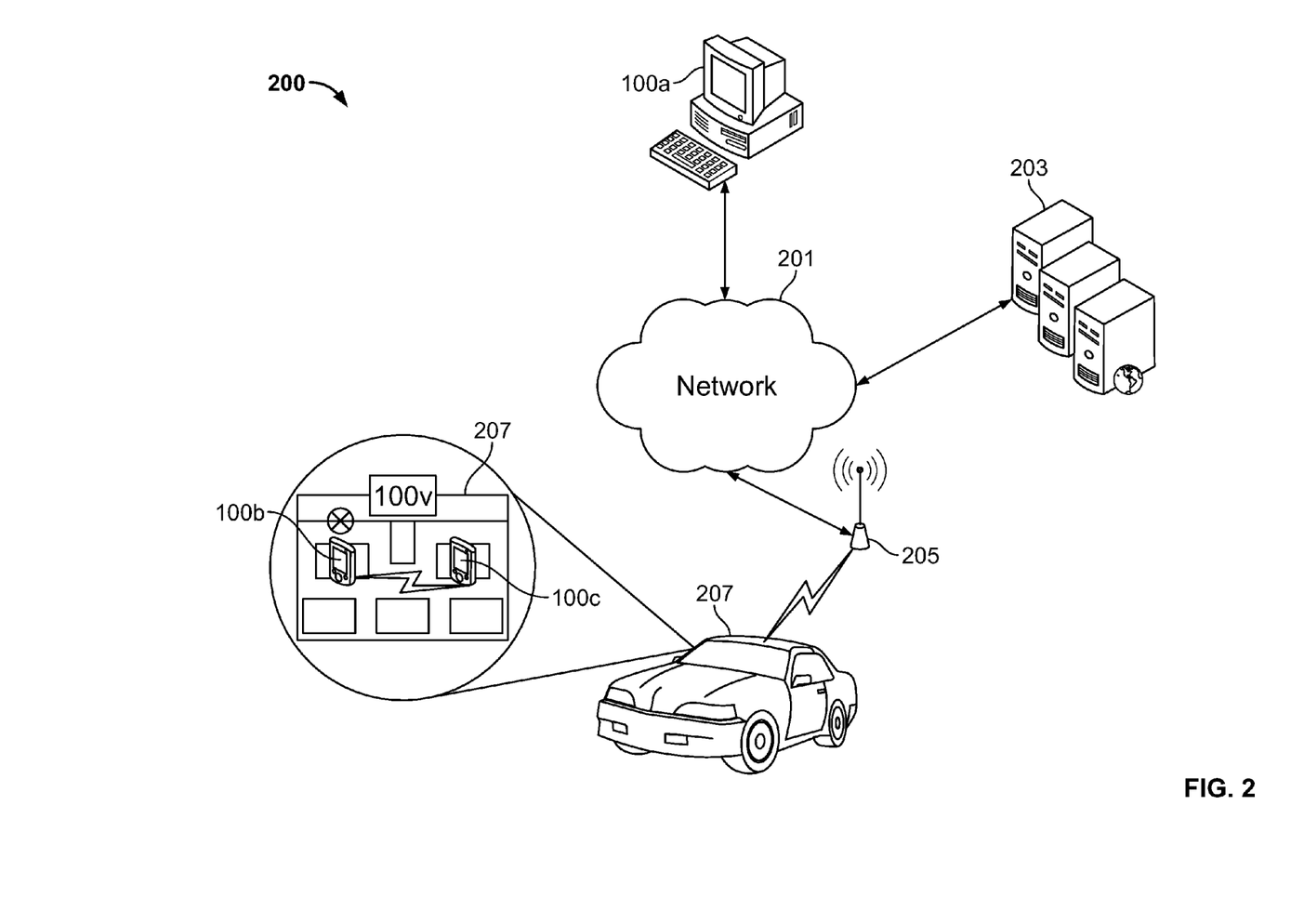
FIG. 2 illustrates an example network environment for implementing methods according to the present disclosure.

The pre-license program disclosed herein may be implemented on a computing device 100 used in various network environments. FIG. 2 illustrates an example network environment 200 for implementing methods according to the present disclosure. As shown in FIG. 2, the network environment 200 may include a network 201 configured to connect one or more administrative computing devices 100*a*, one or more student computing devices 100*b*, one or more coach computing devices 100*c*, and one or more vehicle computing devices 100*v*. The network 201 may also provide a path for connecting to application servers 203. The network 201 may be any type of network, like the network 130 described above. In particular, the network 201 may include a cellular network and its components, such as base stations, cell towers, etc. The network environment 200 may include access points 205 to extend the network 201 to reach mobile computing devices. The access points 205 may include cellular network components (e.g., cell towers, base stations, etc.), global positions system components (e.g., antennas, satellites, etc.), and other wireless access components (e.g., routers) for connecting the student computing devices 100*b*, coach computing devices 100*c*, and/or vehicle computing devices 100*v* to the network 201. As such, through the network 200, the student computing devices 100*b*, coach computing devices 100*c*, and/or vehicle computing devices 100*v* may communicate with application servers 203 to obtain various information, such as coaching information, driving statistics, maps, the time of day, weather information, traffic information, position information, software updates, etc.

In some embodiments, one or more of the application servers 203 may be configured to provide a service that receives drive data from users so that users can review their drive data. For example, an application server 203 may host a website that users can visit to see their drive data and possibly the drive data of others. In some examples, the drive data of a group of students (e.g., students in the same driving school) may be grouped together. An application server 203 may provide a webpage that ranks students within their group (e.g., driving school) and/or that ranks groups (e.g., driving schools) based on the performance of their students. Coaches may also access this service to see what skills of their students should get more attention.

Referring to FIG. 2, the administrative computing device 100*a* may be configured to generate, edit, manage, and deliver the suite of pre-license applications (e.g., pre-license driver application, pre-license coach application, pre-license vehicle application, etc.) or pre-license program. The suite of pre-license applications or pre-license program may be downloaded, installed, and executed on one or more student computing devices 100*b*, coach computing devices 100*c*, and/or vehicle computing devices 100*v*. In some examples, the administrative computing device 100*a* may execute the pre-license program in tandem with a student computing device 100*b*, coach computing device 100*c*, and/or vehicle computing device 100*v*. The server-side computing device 100*a* may, for example, render graphics and webpages which are then streamed to these other computing devices 100*b*, 100*c*, 100*v* which may be used to supply user inputs so that the user may interact with the pre-license program. As shown in FIG. 2, the student computing device 100*b* and coach computing device 100*c* may be a portable user device, such as a smartphone, tablet, laptop, etc., that a user may take with them into a vehicle 207. Although FIG. 2 shows the vehicle 207 as being a car, the vehicle 207 may be a motorcycle, truck, bus, boat, plane, etc.

When the student computing device 100*b* and coach computing device 100*c* are inside or near the vehicle 207, they may communicate with the vehicle computing device 100*v*. In some examples, the vehicle computing device 100*v* may include the vehicle's on-board diagnostic (OBD) system. The student computing device 100*b* and/or coach computing device 100*c* may communicate with the vehicle computing device 100*v* via a wired connection (e.g., USB, OBD II connector, etc.) or a wireless connection (e.g., Bluetooth).

FIG. 2 includes an exploded view of the inside of the vehicle 207 to illustrate example operating positions and lines of communication of the various computing devices. As shown, the driver, also referred to as the student since the driver may be learning to drive, may position his/her phone (an example of a student computing device 100*b*) on a center console or other flat surface within the vehicle 207. In some cases, the student computing device 100*b* may be positioned out of reach and/or view of the driver during the drive as the driver may be expected to focus on driving and not on using the student computing device 100*b*. Meanwhile, a passenger (e.g., a parent, coach, etc.) of the vehicle 207, who intends to teach the student how to drive or how to improve at driving, may hold or otherwise position his/her phone (an example of a coach computing device 100*c*) so that he/she may view its screen, hear audio from its microphone, and/or provide user inputs via its keypad, buttons, etc. Thus, when the coach computing device 100*c* presents coaching information, the passenger (or coach) may provide verbal feedback to the student about his/her driving.

In some cases, instead of, or in addition to, receiving coaching information through their coach computing device 100*c*, the passenger might receive the coaching information from the vehicle computing device 100*v* via a display of the vehicle 207. The vehicle computing device 100*c* may be installed behind the dashboard of a vehicle 207 (or elsewhere in the vehicle). The driver or passenger may interface with the vehicle computing device 100*v* by operating buttons on the dashboard, touching a display on the dashboard, or providing verbal commands.

Figure 3:
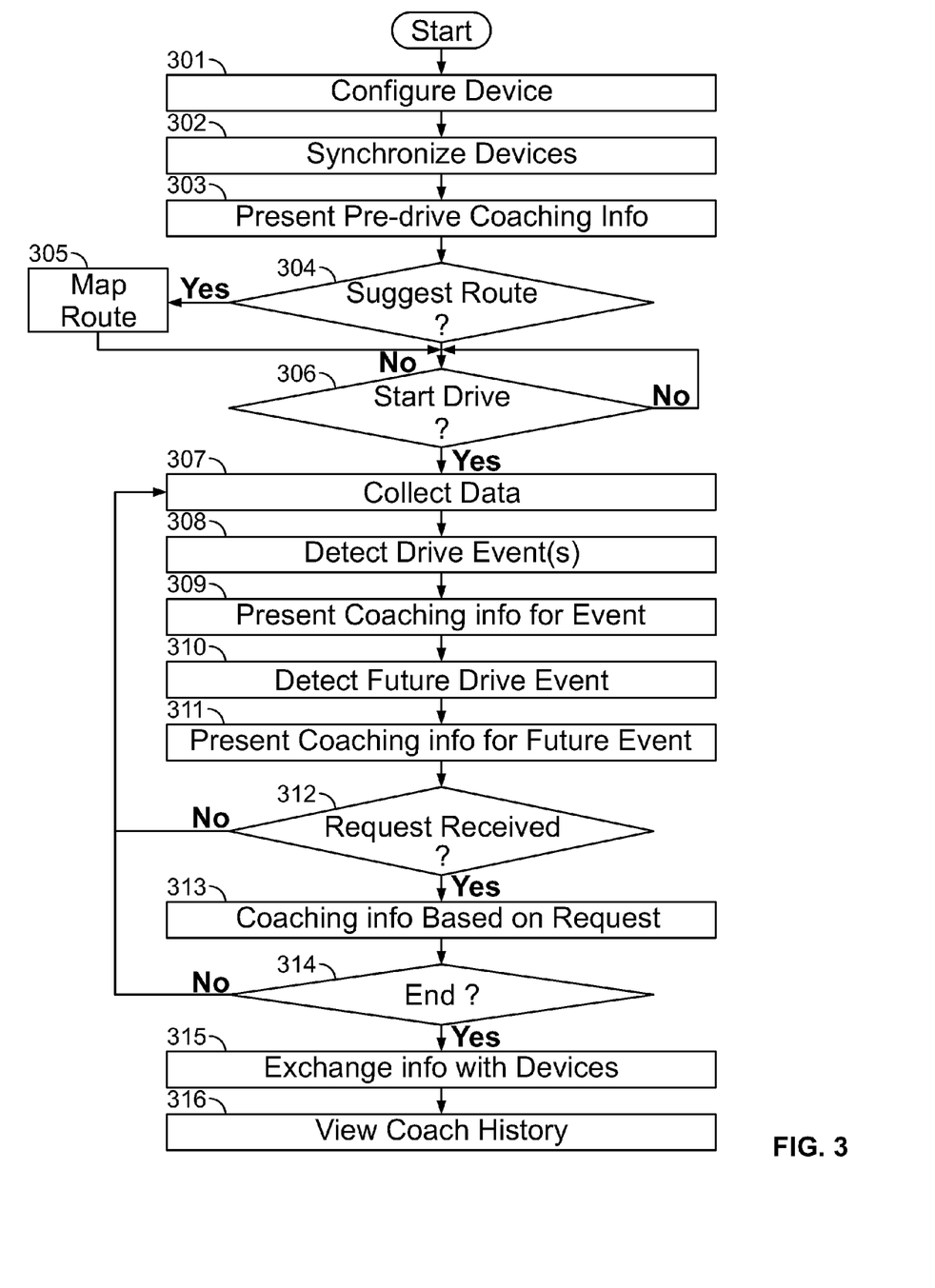
FIG. 3 illustrates a flow diagram of an example process in accordance with aspects of the present disclosure.

FIG. 3 illustrates a flow diagram for an example process in accordance with aspects of the present disclosure. More specifically, FIG. 3 illustrates a plurality of steps a coach computing device 100*c* may perform to provide a passenger with coaching information that the passenger may use to give advice to a student driver while driving. One or more of the steps of FIG. 3 may be performed as a result of executing the pre-license program on the coach computing device 100c.

As shown in FIG. 3, the process may begin with a step of configuring the coach computing device 100c in step 301. Configuring the coach computing device 100c may include downloading and installing the pre-license program. Further, it may include entering information about the driver and/or coach. For example, a user may enter the age of the driver, the gender of the driver, the state the driver has a driver's permit in (or the state that the driver intends to get his/her license in), a date in which the user received his/her driver's permit, a date the user expects to take a driver's test to receive a full license, etc. With regards to the coach, the user may enter the coach's age, coach's gender, coach's driver license number, coach's insurance policy number, etc. At step 301, the user may also enter information about the vehicle, such as the make, model, and year of the vehicle.

Additionally, configuration may include registering the coach computing device 100c with an application server 203 so that the coach computing device 100c may receive data to carry out certain aspects of the coaching process. For example, the coach computing device 100c may register with an application server 203 to receive coaching information or statistics related to other drivers and coaches so that driving and coaching performance can be compared to others. Registration may include creating a username and password to be associated with the coach and/or an account (e.g., insurance account) of the coach. Such registration may be performed through a web portal, which may be accessed through the pre-license program. The registration process may also result in creating a web page, hosted by the administrative computing device 100a or application server 203, to which the coach computing device 100c may upload information, such as coaching information, and pictures.

At step 302, the coach computing device 100c may synchronize with the student computing device 100b and/or vehicle computing device 100d. Synchronization may include establishing a connection (e.g., a Bluetooth connection) for communicating information between the devices. In some cases, synchronization may also include establishing a reference time so that data on one device may be correlated with data on another device. For example, synchronization may include establishing a reference time so that the time at which a driver made a left turn can be correlated with the time at which a coach told the user to look out for other vehicles or with the time at which the vehicle's left turn signal was activated.

In step 303, the coach computing device 100c may present pre-drive coaching information. This may include displaying a checklist of things a student should do before beginning to drive. For example, the checklist may include checking/adjusting mirrors, buckling a seatbelt, reminding passengers to buckle seatbelts, checking tires, checking oil, etc. The checklist may be interactive so that the coach may check off items in the checklist as the driver performs them.

Additionally, the pre-drive coaching information may include advice for the driver regarding an upcoming drive. For example, the pre-drive coaching information may include advising the driver to focus on braking earlier or going through turns at slower speeds. In some cases, the pre-drive coaching information may be customized for the particular driver based on the driver's driving history. For example, if it is determined that the driver previously had difficulty braking smoothly, the pre-driving coaching information may inform the coach to remind the driver that the driver should focus on braking smoothly. Or, if the driver's past performances indicate that he/she has done well with turning at slow speeds, the pre-driving information may suggest advising the driver to work on turning at higher speeds in order to advance the driver's skills.

Step 304 may include prompting the user to determine if the user would like a suggested route. Some coaches may desire assistance picking routes suited for the driver or routes that give the driver various driving experiences. For example, a coach may want to take a route that has less traffic so that the student can practice without the added pressure of other drivers. Or, a coach might want the student to practice driving in certain conditions, e.g., driving on a highway, if the student has not had much experience in such conditions. When prompting the user at step 304, the pre-license program may give the user a number of options for the user to select (e.g., less traffic, slower speeds, total drive time, etc.) that the pre-license program may consider when mapping a suggested route.

If the coach agrees to receive a suggested route (Yes at 304), the pre-license program may map one or more suggested routes at step 305. In mapping suggested routes, the pre-license program may consider the driver's history. For example, the pre-license program may determine that the driver is ready to practice driving on the highway, and may suggest a route that includes driving on a highway. Or, the pre-license program may determine that the driver needs more practice braking, and thus, may suggest a route that would require more stops. To aid in suggesting routes, the pre-license program may evaluate maps from third party entities (e.g., Google Maps, Yahoo Maps, etc.). For example, if the pre-license program determines that the user should practice merging onto a highway, the pre-license program may analyze map data to determine where a nearby highway merger exists.

In step 306, the coach computing device 100c may determine whether to start collecting data for a drive. A user may indicate that a drive is starting by pressing a button or otherwise making a user selection on the coach computing device 100c to indicate that the drive is starting. In some cases, step 306 may require the user to perform a calibration process in which the user places the phone on a flat surface in a stable, non-moving position. The coach computing device 100c may then establish a reference orientation and speed so that it can begin collecting data using its GPS, 3-axis accelerometer, gyroscope, etc.

The pre-license program may begin to collect drive data, such as vehicle telematics data, at step 307. In particular, the pre-license program may read data from the coach computing device's 100c 3-axis accelerometer, gyroscope, and/or GPS at step 307 to collect some types of drive data, such as acceleration, deceleration, g-force, speed, etc. For example, the 3-axis accelerometer of the coach computing device 100c may output the value of acceleration in an x-direction that the pre-license program may equate to an acceleration of the vehicle in a forward direction. Thus, pre-license program may use capabilities of the coach computing device 100c to get drive data. Notably, drive data is not limited to types of movement data or vehicle telematics data, and may include any type of data related to the drive, such as time of day information, day or night information, weather conditions during the drive, road conditions (e.g., side road or highway), traffic conditions (e.g., light, medium, heavy, etc.), position information, etc. Some types of drive data, e.g., time of day, may be received from the coach computing device 100c, while other types may be received from one or more application servers 203 in communication with the coach computing device 100c.

Additionally, or alternatively, the pre-license program may collect drive data from the student computing device 100b. Specifically, data from a 3-axis accelerometer, gyroscope, and/or GPS of a student computing device 100b may be transmitted from the student computing device 100c to the coach computing device 100c. Therefore, the coach computing device 100c might not use its own components to get the drive data. For example, if the user (coach) of the coach computing device 100c is moving the coach computing device 100c because, e.g., the coach is reading coaching information, talking on the phone, etc., the coach computing device 100c may choose to use drive data from the student computing device 100b rather than its own drive data. However, in some cases, the pre-license program executing on the coach computing device 100c may consider drive data from both the coach computing device 100c and the student computing device 100b. For example, the pre-license program may compare the data generated by a 3-axis accelerometer of the same device, that is, the coach computing device 100c, with data generated by a 3-axis accelerometer of a student computing device 100b to determine more accurate drive data. In some examples, the coach computing device 100c may determine to average or otherwise merge the results.

Further, in addition to, or instead of, receiving drive data from the student computing device 100b, the coach computing device 100c may receive drive data, including, e.g., vehicle telematics data, from the vehicle computing device 100v. Specifically, the pre-license program may cause the coach computing device 100c to query the vehicle computing device 100v of the vehicle 207 that it is inside to provide it with drive data. The vehicle computing device 100v may then transmit drive data that it has collected. Some vehicles may be equipped with sensors, 3-axis accelerometers, gyroscopes, GPS, etc. that provide them with drive data that can be used by the pre-license program for detecting events. The coach computing device 100c may receive drive data from the vehicle computing device 100v via a wireless connection (e.g., Bluetooth) or a wired connection (e.g., OBD II connector).

As the coach computing device 100c receives/collects drive data, the pre-license program may analyze the data to detect drive events at step 308. A variety of drive events may be detected at step 308. The drive events may be related to driving maneuvers (e.g., braking, turning, accelerating, decelerating, swerving, changing lanes, parking, tailgating, etc.). For example, vehicle telematics data may be analyzed to detect some types of drive events. Further, some drive events may be related to driving characteristics (e.g., driving speed, a level of alertness of driver, distractions during driving, etc.). For example, the pre-license program may detect that the driver is speeding based on speed limit information. In another example, cameras monitoring the driver's eyes or head position may provide information that the pre-license program may use to detect that the driver is not focusing on the road. Yet another example may include analyzing setting changes (e.g., changing a radio station or volume, answering a phone, sending a text message, etc.), to detect a drive event indicating that the driver may have been distracted during the drive. Additionally, some drive events may be related to driving conditions (e.g., time of day, weather conditions, road conditions, traffic conditions, etc.). For example, the pre-license program may use weather information obtained during the drive to determine that it is raining during the drive.

In particular, in step 308, the pre-license program may detect whether a brake event occurred based on data collected at step 307. Specifically, the pre-license program may use one or more algorithms to analyze the drive data to detect a brake event. For example, braking may be associated with deceleration data, and therefore, by analyzing such data, the pre-license program may determine whether a brake event has occurred. More specifically, a braking event may be detected if deceleration data indicates a threshold change in speed was exceeded (e.g., the vehicle speed decreased by at least 20 mph) and a minimum speed threshold was reached (e.g., the vehicle slowed down to 1 mph). Other algorithms may also be used to detect a brake event.

The pre-license program may also detect whether a turn event occurred at step 308. Specifically, the pre-license program may use one or more algorithms to analyze the data to detect a turn event. For example, turning may be associated with g-force data, and therefore, by analyzing such data, the pre-license program may determine whether a turn event has occurred. More specifically, a turning event may be detected if the g-force reaches a particular level (e.g., 1 g) and maintains that level for a particular period of time (e.g., 2 seconds). Other algorithms may also be used to detect a turn event.

In response to detecting an event, such as a brake event or turn event, the pre-license program may cause the coach computing device 100c to present coaching information at step 309. Presenting the coaching information may include displaying the coaching information on a screen (or display) of the coach computing device 100c and/or outputting an audible message via the coach computing device 100c. The coaching information presented may be related to the detected event. For example, if a brake event was detected, the coaching information may include advice to the coach to tell the driver how he/she might improve breaking. Accordingly, coaching information may be presented to the coach in real-time as the user is driving, so that the coach may instruct the student in real-time.

In preparing the coaching information, the pre-license program may compare the drive data of the drive event to standards for the drive event. For example, the pre-license program may compare drive data for a turn event with standards developed for what the drive data for a turn event should be. Based on how similar the drive data for the driver's drive event compares against the standard data for that drive event, the pre-license program may recommend praising the driver. For example, if the driver made a turn that the pre-license program determined was within some threshold of ideal drive data for a turn, the pre-license program may prepare coaching information that suggests praising the driver for his/her turn.

The coaching information presented at step 309 may also depend on the driver's skill level/experience. That is, for more advanced drivers, the coaching information may include more details. Accordingly, as the driving skills of a student progress, the coaching information may become more advanced and may focus on the finer points of driving. The pre-license program may assess the driver's skill/experience based on past drive data. In particular, the pre-license program may consider the number of minutes the student has driven, the number of drive events the student performed, and/or how well the student performed drive events. Notably, the pre-license program may determine that the student is more adept in some areas of driving than others. For example, the pre-license program may determine that a student is more advanced/experienced at brake events than turn events, and therefore, the coaching information it suggests for that student may be more detailed for brake events than turn events.

The coaching information may also be based on driving characteristics and driving conditions. For example, if it is detected that the driver is not focusing on the road, the coaching information may provide advice that the driver should look at the road. The coaching information may also include statistics, such as a percentage of accidents caused by drivers not looking at the road, so that the coach may inform the driver of the potential consequences of the driver's behavior. In another example, if it is detected that the driver is driving in the rain, the coaching information may include providing advice for how to drive in the rain, such as how to avoid hydroplaning or what to do in the event of hydroplaning.

In addition to presenting the coaching information to the coach, the pre-license program may cause the coach computing device 100c to provide audio feedback that the driver can hear. This audio feedback may be an audible message corresponding to the coaching information, in which case the coach might not have to provide the instructions. Alternatively, the audio feedback may simply provide various sounds (e.g., beeps) that the driver may recognize as being a positive or negative response to their driving performance.

Figure 4A:
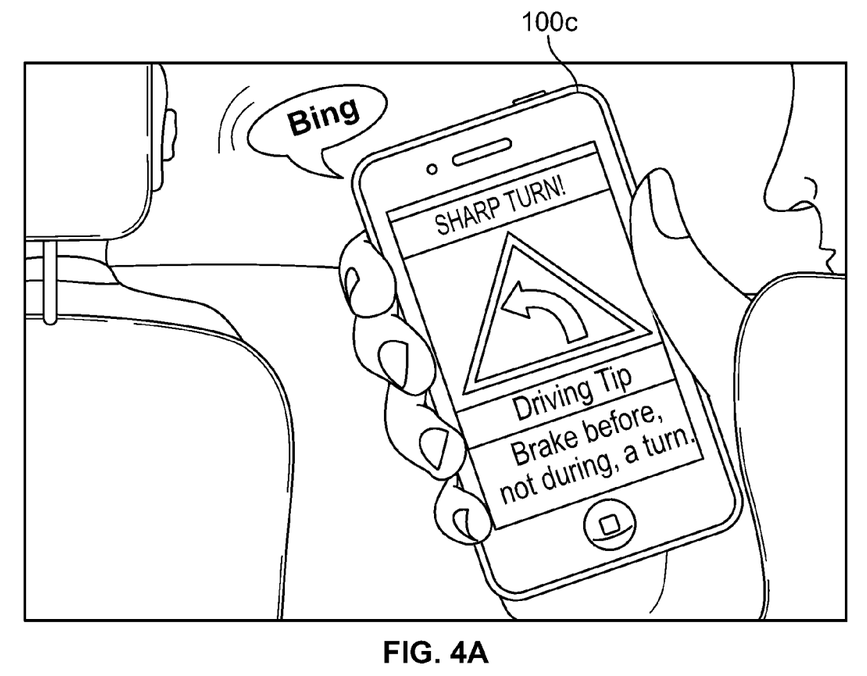
FIGS. 4A and 4B illustrate high-level diagrams of example interfaces presented by an application in accordance with aspects of the present disclosure.

FIG. 4A illustrates an example of coaching information that the pre-license program may present on the coach computing device 100c. As shown, the coaching information may include a driving tip for the coach to explain to the student. In the example of FIG. 4A, the driving tip may include the message "brake before, not during, a turn." This tip may be generated based on the drive data collected for a recently detected turn event. Here, based on the drive data, the pre-license program may have determined that the driver did not brake enough before the turn, and instead, used the brake too much in the turn. Using the results of this determination, the pre-license program may then generate the coaching information and present it to the coach as shown.

Figure 4B:
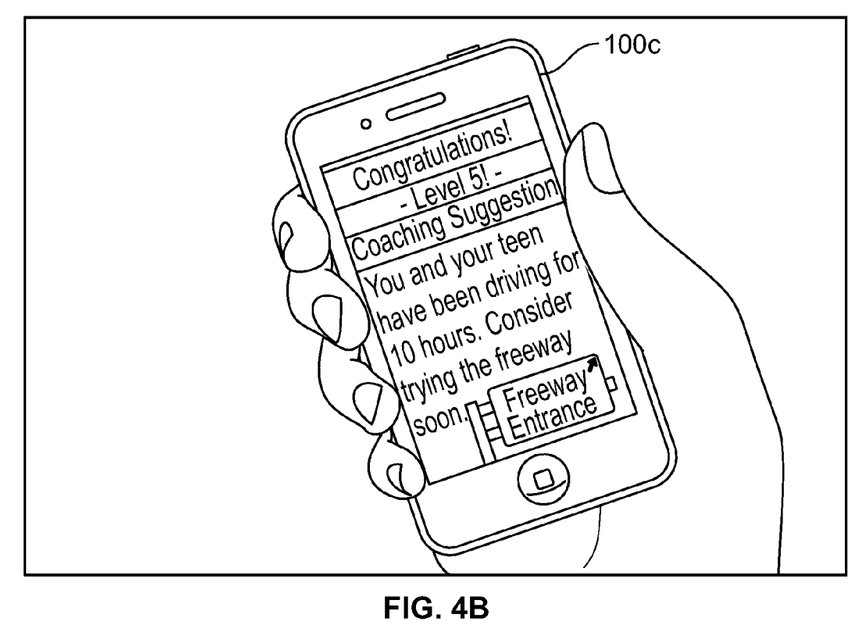

FIG. 4B illustrates another example of coaching information that the pre-license program may present on the coach computing device 100c. As shown, the coaching information may include a coaching suggestion for the coach. In the example of FIG. 4B, the driving suggestion may include the message "consider trying the freeway soon." This driving suggestion may therefore inform the coach that the student is ready to, or should attempt to, drive on a freeway. Such a driving suggestion may be generated based on the collected drive data. For example, if the collected drive data indicates that the user is braking and/or turning well at slow speeds, the driving suggestion may be to try the freeway. The pre-license program may also consider how much time the driver has spent driving in determining what suggestions to make. Moreover, the pre-license program may review past driving experiences when generating suggestions. For example, the pre-license program may check a driving history and determine that the user has not yet driven on a freeway, and then prepare the driving suggestion that the student should consider driving on the freeway.

Returning to FIG. 3, step 310 may include detecting a potential future drive event, that is, a drive event that has not yet occurred. The pre-license program may predict a future drive event using map information and position information (e.g., GPS data). In cases where the pre-license program has suggested a route or knows of a route, the pre-license program may determine that certain drive events are coming up. For example, the pre-license program may analyze a route and the location of the vehicle along that route to determine that a turn event is likely to occur soon. Or, the pre-license program may analyze the route to identify a stop sign that the vehicle is approaching, and therefore, may determine that a brake event is likely to occur soon.

When a future drive event is detected, the pre-license program may provide coaching information related to the future event to the coach computing device 100c in advance of the future drive event. That is, at step 311, the pre-license program may present coaching information for drive events that have not yet occurred, but are expected to occur. The coach may use this coaching information to provide instruction to the driver for handling the future drive event. The pre-license program may also inform the coach of a timing for providing the driver with instructions. For example, the pre-license program may determine that the vehicle is located 100 feet from a stop sign, and therefore, may recommend that the coach provide instructions to tell the driver to start slowing down at this point. The pre-license program may also factor in the speed of the vehicle when determining the ideal time that the instruction should be given.

In some embodiments, when, or after, the coach computing device 100c presents coaching information, the pre-license program may also prompt the coach for user input related to the coaching information. For example, the pre-license program may prompt the coach to provide input as to whether or not the coaching information was provided to the student or otherwise accepted. In some cases, coaches might decide not to provide the coaching information to the student, and instead remain silent or give their own instructions. In such cases, the coach may provide user inputs indicating that it rejected or did not provide the coaching information to the student. On the other hand, the coach may choose to provide the coaching information to the student and may provide an input indicating that the coaching information was given.

Moreover, when, or after, presenting the coaching information and/or prompting the coach for user input regarding whether the coaching information was given, the pre-license program may also prompt the coach for input as to whether or not the student followed the coach's advice (e.g., performed the action recommended by the coaching information). The coach may provide an input indicating whether they believe the driver followed the advice or did not follow the advice (e.g., ignored the advice or failed to follow the advice). Accordingly, the pre-license program may allow the coach to subjectively score, rate, or otherwise grade the driver's performance and/or ability to follow the coaching advice.

In step 312, the pre-license program monitors user inputs to check for user requests. At times, a coach may want to request particular coaching information whether or not the user has performed a related drive event or will perform a related drive event in the near future. That is, the coach may want to provide instructions for a particular drive event even though the pre-license program has not detected that event. Accordingly, the coach may request specific coaching information by navigating through predefined categories of coaching information and/or performing a keyword search. Based on the user's request, the pre-license program may retrieve the appropriate coaching information at step 313.

Step 314 may include determining whether the drive has ended. In some cases, the pre-license program may automatically determine that the drive has ended if the car has not moved for a predetermined period of time (e.g., 10 minutes). On the other hand, the pre-license program may rely on the user to inform it that the drive has ended. Notably, as long as the drive continues, the pre-license program may continue to perform steps 307-313. Moreover, it should be understood that these steps do not have to be performed in the order shown. For example, the pre-license program may detect a future drive event before it detects a drive event that has already occurred. Further, the pre-license program may present coaching information for multiple past drive events before presenting coaching information for a future drive event. Also, user requests for particular coaching information may be received and handled at any time during the drive. In short, the order that steps 307-313 are performed will depend on the events of the particular drive and the user inputs during that drive.

After the drive is over, at step 315, the coach computing device 100*c* may exchange drive data with other computing devices, such as the student computing device 100*b* and vehicle computing device 100*v*. For example, the coach computing device 100*c* may share the coaching information it presented during the drive with the student computing device 100*b*, so that the student may view the coaching information on his/her own device. Additionally, or alternatively, the coach computing device 100*c* may share a recording of the coach's instructions to the driver that the coach computing device 100*c* recorded using its microphone. Further, the coach computing device 100*c* may provide a report of the inputs that the coach made during the drive. For example, the coach computing device 100*c* may provide a report showing which coaching information the coach accepted or provided and which coaching information the coach rejected or did not provide. Such a report may also indicate which coaching advice the coach thought the student followed and which coaching advice the coach thought the student did not follow. As such, a student computing device 100*b* receiving such reports may give the student the opportunity to review the coach's decisions and thoughts about the student's driving performance.

In step 315, the coach computing device 100*c* may also upload information to an administrative computing device 100*a* or application server 203 via the network 201. Such information may include a number of minutes spent coaching/training the student driver. This information may be compiled at the administrative computing device 100*a* or application server 203 so that statistics reflecting how much time coaches are spending on training student drivers can be generated. Other types of information may be uploaded as well. The coach computing device 100*c* may include a camera, and therefore, may be used to take photographs of the student while he/she is driving. The coach computing device 100*c* could also be used to take photographs of various driving experiences, such as the student's first flat tire, first time driving to the beach, etc. The pre-license program may facilitate posting or sharing these photographs on a webpage hosted by the administrative computing device 100*a* or application server 203.

Step 316 illustrates that the pre-license program may provide the coach with coaching history data. The pre-license program may store drive data and a log of coaching information that it presented to the coach after each drive. As the pre-license program is used for a number of drives, the pre-license program may compile the data for each drive to prepare an overview of the student's and/or coach's performance. For example, the pre-license program may prepare a report showing the coaching information that was previously provided on a drive-by-drive basis. The coach history data may also show how many minutes the coach has spent teaching the student. Further, the coach history data may provide statistics acquired from other coaches to show the coach how much time other coaches are spending teaching their students. From such statistical information, coaches may assess themselves and determine whether they should be spending more time training their student.

Although FIG. 3 depicts step 316 as the last step, it should be understood that the coaching history data may be viewed at any time and that other steps may be performed after it. In general, FIG. 3 illustrates steps in an example order, but the steps may be implemented in various orders. Indeed, the various features and steps may be combined, divided, omitted, and/or augmented in any desired manner, depending on the specific process desired. For example, the pre-license program may present route suggestions as described with respect to steps 304 and 305 during the drive as well. Also, the user could request coaching information, as described with respect to step 312, before or after drives. The processes of the pre-license program should not be limited to the example embodiments described.

Figure 5:
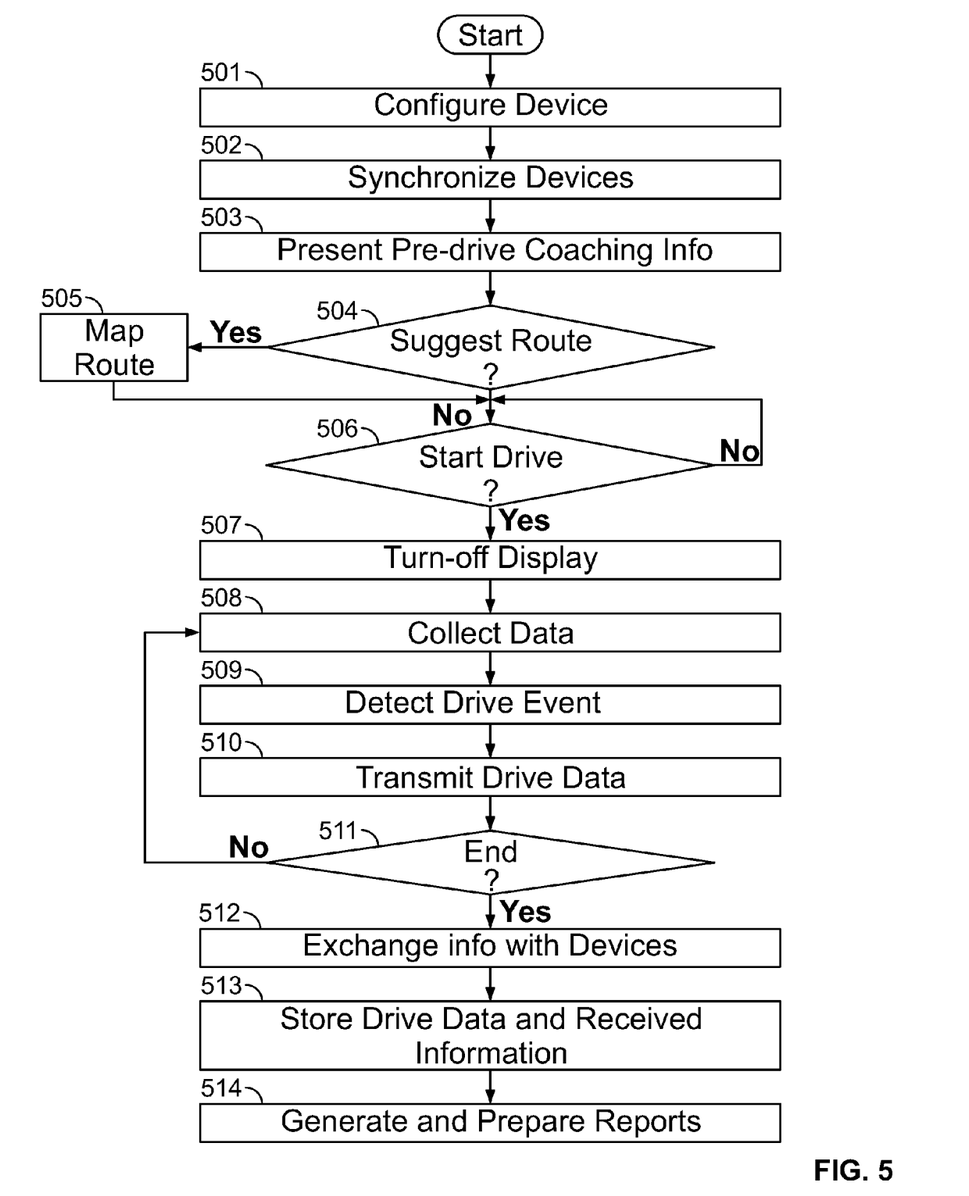
FIG. 5 illustrates a flow diagram of an example process in accordance with aspects of the present disclosure.

FIG. 5 illustrates a flow diagram for an example process in accordance with aspects of the present disclosure. More specifically, FIG. 5 illustrates a plurality of steps a student computing device 100*b* may perform to provide a student with feedback as they learn to drive. One or more of the steps of FIG. 5 may be performed as a result of executing the pre-license program on the student computing device 100*b*.

As shown in FIG. 5, the process may begin with a step of configuring the student computing device 100*b* in step 501. The configuration in step 501 may be performed in a similar manner to the configuration in step 301 of FIG. 3. That is, the configuration may include calibrating the student computing device 100*b* and registering the student with the administrative computing device 100*a* or an application server 203. In the registration process, students may set up a profile for themselves. They may provide their name, age, driver's permit number, state they are trying to receive a driver's license in, etc. Students may also set up profiles for coaches that they anticipate having (or have had) teach them to drive. For example, a teenager may set up a profile for each of his/her parents so that the teenager can track which parent is giving which instructions, which parent is spending more time training the teenager, etc.

Steps 502-506 may be similarly performed on the student computing device 100*b* in a similar manner that steps 302-306 are performed on the coach computing device 100*c*. However, on the student computing device 100*b*, when the drive is started (Yes at step 506), the student computing device 100*b* may turn off its display. The pre-license program may cause the student computing device 100*b* to turn off its display at step 507 so that the student is not distracted by the display. While the user is driving, the pre-license program might only display a screen on the student computing device 100*b* that allows the user to stop the drive. That is, the pre-license program executing on the student computing device 100*b* may determine that coaching information should not be displayed while the user is driving.

In some embodiments, the pre-license program may cause certain functions of the student computing device 100*b* to be inoperable while the student is driving. For example, the pre-license program may prevent incoming/outgoing phone calls and text messages (e.g., SMS messages). As a result, the pre-license program may help reduce the likelihood that the student becomes distracted by the student computing device 100*b* while driving.

At step 508, the pre-license program may cause the student computing device 100*b* to collect drive data, such as vehicle telematics data. Drive data may be collected from the student computing device 100*b* in a similar manner that drive data is collected from the coach computing device 100*c* as described above. That is, the pre-license program may collect drive data from a 3-axis accelerometer, gyroscope, GPS, etc. of the student computing device 100*b*. Additionally, or alternatively, the pre-license program executing on the student computing device 100*b* may receive the drive data from the vehicle computing device 100*v* and/or the coach computing device 100*c*. Also, at step 509, drive events may be detected based on the collected drive data. Notably, the pre-license program may collect drive data and detect drive events without notifying the student during the drive so as not to distract the student.

Although FIG. 5 does not show steps for presenting coaching information, in some embodiments, the student computing device 100*b* may generate and present coaching information. In particular, the student computing device 100*b* may present audible messages providing the coaching information so that the student does not have to rely on the coach for such coaching information.

Step 510 illustrates that the student computing device 100*b* may transmit drive data while the student is driving. As described above, the drive data may be collected on the student computing device 100*b* and transmitted to the coach computing device 100*c*, which may use the information to present coaching information.

At step 511, the pre-license program may determine whether the student has finished a drive. This may include determining that the vehicle has not moved for some predetermined period of time (e.g., 2 minutes) or receiving an indication from the user that the drive has ended (e.g., the user may press a key on the student computing device 100*b* indicating the end of the drive). After the drive, in step 512, the student computing device 100*b* may exchange data with other devices, such as the administrative computing device 100*a*, the coach computing device 100*c*, and/or vehicle computing device 100*v*. For example, the student computing device 100*b* may send/receive an audio recording of the sound in the car during the drive. This recording, therefore, may include the dialogue between the coach and student, including what tips the coach gave the student. The student may be able to subsequently listen to the audio recording to see what his/her coach said and to compare it against the coaching information which indicates what the coach should have said.

In step 513, the pre-license program may store the collected drive data and information received from other devices on the student computing device 100*b*. In some cases, this data/information may be transmitted to an administrative computing device 100*a* and/or application server 203 and stored in association with the student or student computing device 100*b*.

In step 514, the pre-license program may generate and present reports to the student. These reports may provide feedback on how the user performed during the most recent drive and how the user is progressing. This feedback may be presented with graphs, charts, and other illustrations. The feedback may also be divided into categories to assess various driving skills, such as braking, turning, etc. The reports may also include tips for improving the student's driving skills. Further, the reports may show which goals the user has accomplished and which goals remain. The pre-license application may include a checklist of skills that are tested during a driving test, so the student can keep track of their preparation for the driving test. For example, if parallel parking is required on a driving test, the pre-license program may keep a record of the number of times the student has practiced parallel parking and a score associated with each attempt. The score may be generated by the coach using the coach computing device 100*c* and transmitted to the student computing device 100*b*. The pre-license program may assist the coach in scoring so that the coach gives consistent scores and progress can be tracked. In some cases, the pre-license program may generate the score itself based on entered information, such as the distance between the car and curb after parallel parking. The reports may also keep a log of mandatory pre-license driving time. For states that require a certain amount of driving time, the pre-license program can keep track of the amount of time the student has driven, so that it can be determined whether the student has met the requirements, or on track to meet the requirements, for the state he/she hopes to obtain a license in.

Figure 6A:
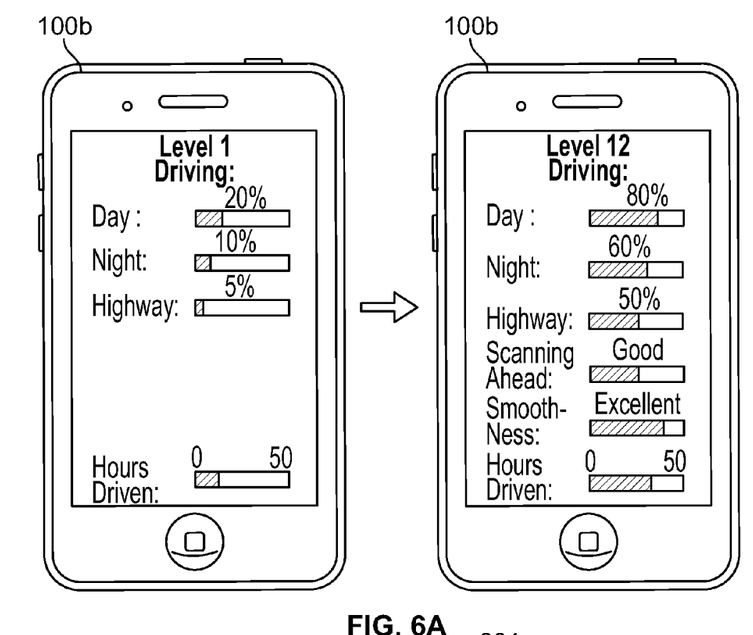
FIGS. 6A and 6B illustrate high-level diagrams of example interfaces presented by an application in accordance with aspects of the present disclosure.

FIG. 6A illustrates examples of progress reports that the pre-license program may present on the student computing device 100*b* at step 514. As shown, the progress reports may include bar graphs to reflect the student's driving experience/skill in a number of categories. In the examples of FIG. 6A, the categories in which the student is assessed include day driving, night driving, highway driving, scanning ahead, smoothness, total time (e.g., hours) of driving. The values for the categories may be calculated by the pre-license program based on various algorithms using various thresholds.

Some values may be directly proportional to an amount of time driving under certain conditions. For example, the value of the night driving category may be a reflection of the number of minutes a user has driven at night. Information regarding whether a student is driving at night or day may be included within the drive data collected at step 508. Standards may be established setting forth the ideal/recommended amount of time a student should spend driving at night. Then, the amount of time the student has spent driving at night may be compared to these standards to receive a score or percentage as shown.

On the other hand, some values may be determined based on subjective and/or objective data collected at step 508. For example, the scanning ahead score of FIG. 6A may be based on subjective data entered by a coach via a coach computing device 100*c*. The pre-license program running on the student computing device 100*b* may receive the subjective score from the coach and incorporate it into its reports. Meanwhile, the smoothness score may be based on objective drive data collected in step 508. The pre-license program executing on the student computing device 100*b* may analyze acceleration and deceleration data collected through the student computing device 100*b*, coach computing device 100*c*, and/or vehicle computing device 100*v*. Specifically, the pre-license program may compare such acceleration and deceleration data with predefined thresholds to determine how smoothly the student is driving. Generally, constant or gradually increasing acceleration and constant or gradually decreasing deceleration may indicate smooth driving.

FIG. 6A also illustrates that the pre-license program may prescribe different levels (e.g., level 1, level 12, etc.) to students as their skills and experience progress. As a student demonstrates better driving skills and/or acquires more driving experience (e.g., in terms of driving time), the pre-license program may determine that the user has reached different levels. For example, the pre-license program may determine that the student has reached level 2 when the student exceeds a first minimum threshold in a set of categories and reached level 3 when the student exceeds a second minimum threshold, higher than the first minimum threshold, in the set of categories. By prescribing levels to the students, the pre-license program may help the user appreciate their improvements and incentivize or encourage the student to continue to work on their driving skills.

Figure 6B:
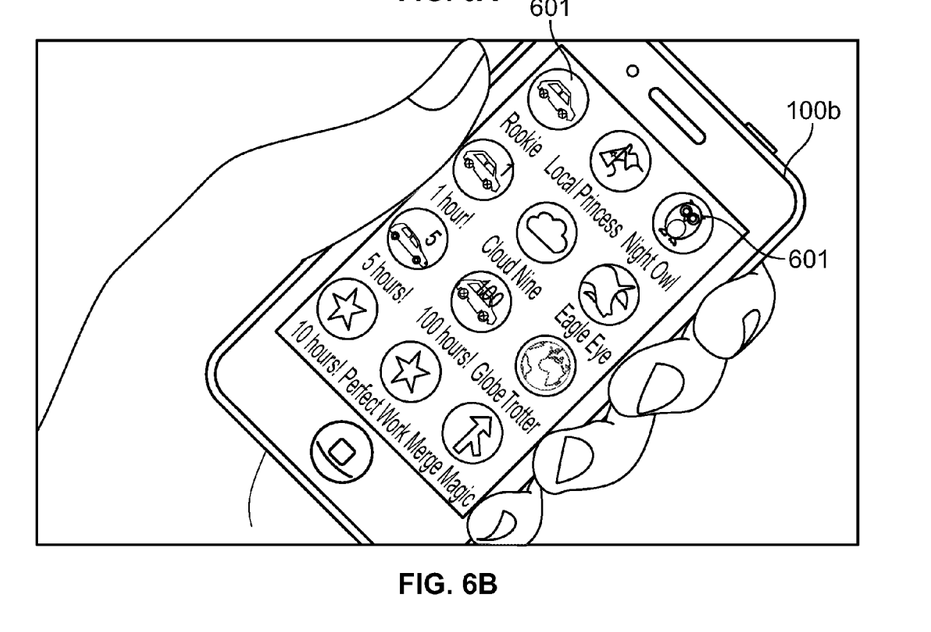

FIG. 6B illustrates examples of additional feedback that the pre-license program may present on the student computing device 100b at step 514. As shown, the pre-license program may recognize certain accomplishments achieved by the student and may reward the student with badges 601. Similar to prescribing levels, the pre-license program may prescribe certain badges 601 to highlight certain student achievements as they the student advances towards driving proficiency. For example, the student may receive a "Night Owl" badge if they drive a total of 3 hours in the dark. In another example, the student may receive a "Globe Trotter" badge if they drive for a certain number of miles or for a certain period of time in a single drive.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. One or more non-transitory computer readable media storing computer-executable instructions that, when executed by at least one processor, cause a computing device to:
   activate an accelerometer, gyroscope, or global positioning system receiver to detect drive data while a driver is driving a vehicle, the drive data including at least one of acceleration data or location data;
   receive the drive data while the driver is driving the vehicle;
   detect a drive event based on the drive data;
   automatically present, on a display of the computing device, coaching information associated with the drive event in response to detecting the drive event;
   present, on the display, a prompt requesting user input related to the automatically presented coaching information, the user input including whether the automatically presented coaching information was provided to the driver, whether the driver followed the automatically presented coaching information, and a performance rating of the driver;
   receive a user request for coaching information while the accelerometer, gyroscope, or global positioning system receiver is activated;
   upon receiving the user request, present, on the display, the user-requested coaching information while the accelerometer, gyroscope, or global positioning system receiver is activated, wherein the user-requested coaching information includes a suggested driving route based on a skill level of the driver and driving conditions;
   detect, based on the drive data, that the driver is no longer driving the vehicle;
   upon detecting that the driver is no longer driving the vehicle, deactivate the accelerometer, gyroscope, or global positioning system receiver; and
   provide, on the display, a drive summary including the automatically presented coaching information and the user-requested coaching information.

2. The non-transitory computer readable media of claim 1, wherein said computer-executable instructions further cause the computing device to:
   determine the automatically presented coaching information based on driver information associated with the driver.

3. The non-transitory computer readable media of claim 2, wherein said computer-executable instructions further cause the computing device to:
   retrieve the driver information from another computing device associated with the driver.

4. The non-transitory computer readable media of claim 3, wherein said computer-executable instructions further cause the computing device to:
   transmit the automatically presented coaching information to the another computing device associated with the driver.

5. The non-transitory computer readable media of claim 1, wherein the drive event comprises at least one of a brake event and a turn event.

6. The non-transitory computer readable media of claim 1, wherein said computer-executable instructions further cause the computing device to:
   predict a future drive event; and
   present additional coaching information associated with the future drive event in response to predicting the future drive event.

7. The non-transitory computer readable media of claim 1, wherein said computer-executable instructions further cause the computing device to:
   determine an experience level associated with the driver based on the detected drive event; and
   generate the suggested driving route based on the determined experience level associated with the driver.

8. The non-transitory computer readable media of claim 1, wherein said computer-executable instructions further cause the computing device to:
   receive, by an input device of the computing device, user input indicating whether the automatically presented coaching information was provided to the driver; and
   in response to receiving the user input, transmit information indicating that the automatically presented coaching information was provided to the driver.

9. An apparatus, comprising:
   an accelerometer, gyroscope, or global positioning system receiver configured to detect drive data while a driver is driving a vehicle, the drive data including at least one of acceleration data or location data;
   a display;
   at least one processor; and
   memory storing computer-executable instructions that, when executed by the at least one processor, cause the apparatus to:
      activate the accelerometer, gyroscope, or global positioning system receiver to detect the drive data;
      receive the drive data while the driver is driving the vehicle;
      detect a drive event based on the drive data;
      automatically present, on the display of the apparatus, coaching information associated with the drive event in response to detecting the drive event;
      present, on the display, a prompt requesting user input related to the automatically presented coaching information, the user input including whether the automatically presented coaching information was provided to the driver, whether the driver followed the automatically presented coaching information, and a performance rating of the driver;
receive a user request for coaching information while the accelerometer, gyroscope, or global positioning system receiver is activated;
upon receiving the user request, present, on the display, the user-requested coaching information while the accelerometer, gyroscope, or global positioning system receiver is activated, wherein the user-requested coaching information includes a suggested route based on a skill level of the driver and driving conditions;
detect, based on the drive data, that the driver is no longer driving the vehicle;
upon detecting that the driver is no longer driving the vehicle, deactivate the accelerometer, gyroscope, or global positioning system receiver; and
provide, on the display, a drive summary including the automatically presented coaching information and the user-requested coaching information.

10. The apparatus of claim 9, wherein said computer-executable instructions further cause the apparatus to:
determine the automatically presented coaching information based on driver information associated with the driver.

11. The apparatus of claim 10, wherein said computer-executable instructions further cause the apparatus to:
retrieve the driver information from another computing device associated with the driver; and
transmit the automatically presented coaching information to the another computing device associated with the driver.

12. The apparatus of claim 9, wherein the drive event comprises at least one of a brake event and a turn event, and wherein said computer-executable instructions further cause the apparatus to:
predict a future drive event; and
present additional coaching information associated with the future drive event in response to predicting the future drive event.

13. A method, comprising:
activating an accelerometer, gyroscope, or global positioning system receiver to detect drive data while a driver is driving a vehicle, the drive data including at least one of acceleration data and location data;
receiving, by at least one processor, the drive data while a driver is driving a vehicle;
detecting a drive event based on the drive data;
automatically presenting, on a display of a computing device, first coaching information associated with the drive event in response to detecting the drive event;
presenting, on the display, a prompt requesting user input related to the first coaching information, the user input including whether the first coaching information was provided to the driver, whether the driver followed the first coaching information, and a performance rating of the driver;
receiving a user request for second coaching information while the accelerometer, gyroscope, or global positioning system receiver is activated;
upon receiving the user request for the second coaching information, presenting, on the display, the second coaching information while the accelerometer, gyroscope, or global positioning system receiver is activated, wherein the second coaching information includes a suggested route based on a skill level of the driver and driving conditions;
detecting, based on the drive data, that the driver is no longer driving the vehicle;
upon detecting that the driver is no longer driving the vehicle, deactivating the accelerometer, gyroscope, or global positioning system receiver; and
providing, on the display, a drive summary including the first coaching information and the second coaching information.

14. The method of claim 13, further comprising:
retrieving driver information from another computing device associated with the driver;
determining the first coaching information based on the driver information associated with the driver; and
transmitting the first coaching information to the another computing device associated with the driver.

15. The method of claim 13, wherein the drive event comprises at least one of a brake event and a turn event.

16. The method of claim 13, further comprising:
predicting a future drive event using map information of the suggested route; and
presenting third coaching information associated with the future drive event in response to predicting the future drive event.

17. The method of claim 13, further comprising:
recording audio within the vehicle while the driver is driving; and
transmitting the recording to another computing device after the drive.

18. The method of claim 13, further comprising:
receiving, by an input device of the computing device, user input indicating whether the first coaching information was provided to the driver; and
in response to receiving the user input, transmitting information indicating that the first coaching information was provided to the driver.

19. A system, comprising:
a first computing device, comprising at least one of an accelerometer or global positioning system receiver configured to detect drive data while a driver is driving a vehicle, the drive data including at least one of acceleration data or location data;
a second computing device configured to communicate over a cellular network; and
a third computing device configured to communicate with the first computing device or the second computing device over a network,
wherein the first computing device is configured to:
activate the at least one of the accelerometer or global positioning system receiver to detect drive data;
receive, via the accelerometer or the global positioning system receiver, the drive data when the driver drives the vehicle;
detect a drive event based on the drive data;
transmit driving information to the second computing device or the third computing device, the driving information associated with the drive data;
upon receiving notification that the driver is no longer driving the vehicle, deactivate the accelerometer, gyroscope, or global positioning system receiver,
wherein the second computing device is further configured to:
receive the driving information from the first computing device or the third computing device;
automatically receive or determine first coaching information based on the driving information;

present, on a display, a prompt requesting user input related to the first coaching information, the user input including whether the first coaching information was provided to the driver, whether the driver followed the first coaching information, and a performance rating of the driver;

receive, by an input device of the second computing device, user input indicating that a coach provided the first coaching information;

receive, by the input device, user input indicating that the first coaching information was followed by a driver;

receive, by the input device, user input indicating the performance rating of the driver; and transmit information indicating that the coach provided the first coaching information and that the first coaching information was followed by the driver to the first computing device or third computing device, receive a user request for second coaching information while the accelerometer, gyroscope, or global positioning system receiver is activated;

upon receiving the user request, present, on the display, the second coaching information while the accelerometer, gyroscope, or global positioning system receiver is activated, wherein the second coaching information includes a suggested route based on a skill level of the driver and driving conditions;

detect, based on the drive data, that the driver is no longer driving the vehicle;

transmit a notification that the driver is no longer driving the vehicle; and provide, on the display, a drive summary including the first coaching information and the second coaching information;

wherein the third computing device is further configured to:

determine the first coaching information based on the driving information; and transmit the first coaching information to the second computing device.

* * * * *